(No Model.) 2 Sheets—Sheet 1.

N. E. SMITH.
PIPE CONNECTION.

No. 456,781. Patented July 28, 1891.

WITNESSES

INVENTOR
Nathaniel E. Smith
BY
Frost + Coe
ATTORNEYS (No Model.)
2 Sheets—Sheet 2.
N. E. SMITH.
PIPE-CONNECTION.
No. 456,781. Patented July 28, 1891.
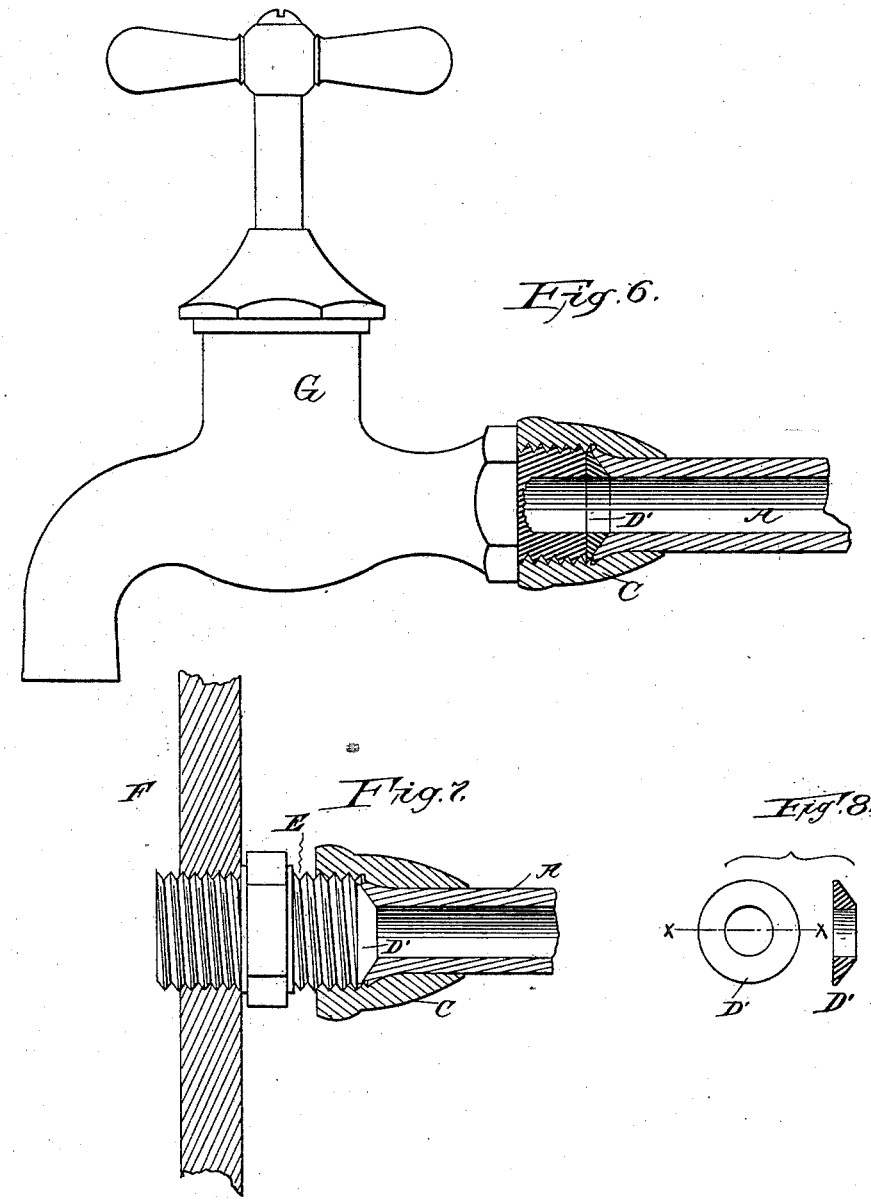
WITNESSES:
INVENTOR
Nathaniel E. Smith
BY
ATTORNEYS

UNITED STATES PATENT OFFICE.

NATHANIEL E. SMITH, OF JERSEY CITY, NEW JERSEY, ASSIGNOR OF ONE-HALF TO PHILLIP E. MARTIN, OF SAME PLACE.

PIPE-CONNECTION.

SPECIFICATION forming part of Letters Patent No. 456,781, dated July 28, 1891.

Application filed August 13, 1889. Serial No. 320,580. (No model.)

*To all whom it may concern:*

Be it known that I, NATHANIEL E. SMITH, a citizen of the United States, residing at Jersey City, in the county of Hudson and State of New Jersey, have invented a new and useful Improvement in Pipe-Connections, of which the following, taken in connection with the accompanying drawings, is a full, clear, and accurate description.

The object of my invention is to form a new and improved pipe-connection to be used for joining lead or other similar pipe, which connection will do away with "wiping" the joint on the pipe, and thus dispense with the skilled labor now necessarily employed to unite the parts of the lead pipe it is desired to join together.

A valuable adaptation of my invention is its use in connection with boilers and water-faucets, where it is desirable to form a connection of a lead pipe with a brass or other metallic pipe harder than lead pipe.

Figure 1:
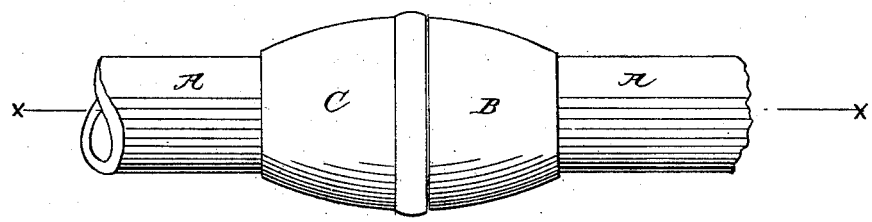
Figure 2:
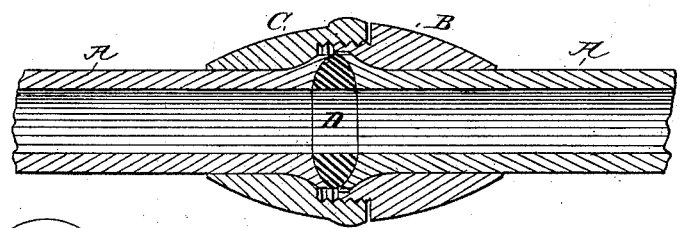
Figure 5:
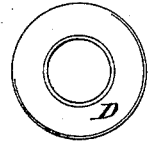
Figure 3:
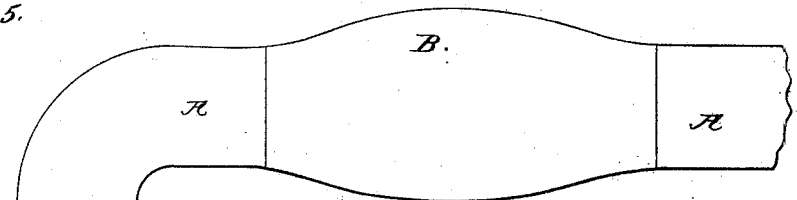
Figure 4:
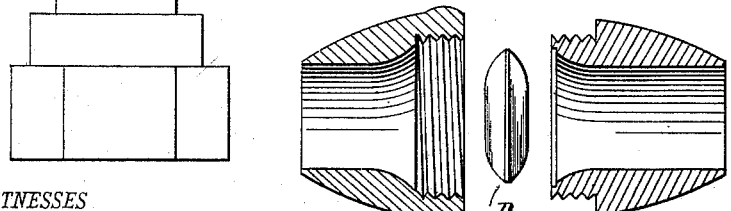

In the drawings, Figure 1 shows a view of my invention as joining two pieces of lead pipe in straight pipe-connections. Fig. 2 shows a sectional view of the same. Fig. 3 shows the old form of connecting pipe by means of a wipe-joint. Figs. 4, 5, and 8 show details of my invention. Fig. 6 shows my invention as applied to a faucet-connection. Fig. 7 shows my invention as applied to a boiler-connection.

Similar letters indicate corresponding parts in the different figures.

A A represent the parts of the lead pipe to be joined. The ends of the lead or soft pipe to be joined are formed by any proper tool or suitable means into a concave form. Upon the outside of one of the ends of the pieces of pipe is placed one portion of a screw-threaded pipe-connection B, said connection being secured in any desired manner, so that it will hold the end of the lead pipe. Upon the end of the other portion of the screw-threaded pipe is placed the other portion of the pipe-connection C.

D is a button or annular ring, of lead or other material, so formed as to correspond in its outer sides to the concavity formed in the ends of the lead pipe and having a hole through its center of the same diameter as the pipe—that is, said button, when used to join lead or soft-metal pipe, is made of a double convex form.

When it is desired to unite soft-metal or lead pipe to brass or harder-metal pipe, as in joining the supply-pipe to the nipple E of the boiler, (see Fig. 7,) or in joining the faucet G to the supply-pipe, (see Fig. 6,) it is only necessary in my invention to have the end of the soft-metal pipe formed into a concave form, as above described, and to have the button D' made of plano-convex form, as shown in Figs. 6, 7, and 8, instead of the double convex form shown in Figs. 1, 2, and 4, D' in Figs. 6, 7, and 8 representing such button.

In joining the two pieces of pipe the button D is placed so that its convex side or sides will touch or bear upon the concave edge of the lead or soft-metal pipe, and the pipe-connections are then screwed together, thus forcing the convexity of the button closely into contact with the concavity of the pipe, the yielding nature of the material of the pipe thus fitted to correspond with each other producing a tight, inexpensive, and reliable joint.

The adaptation and use of my invention in connection with boilers and faucets are especially valuable, in that they do away both with wiping the joint and also with the screw-threaded coupling-piece of brass or hard metal now ordinarily used, with its accompanying piece of brass pipe, which in many instances has to be bent to the desired angle to make the desired connection at the risk of breaking.

Having thus described my invention, what I claim, and desire to secure by Letters Patent, is—

In a pipe-connection, the combination, with a pipe to be connected having an enlarged end, of a perforated metal button and a connecting-piece consisting of a screw-threaded cup holding and directly engaging the pipe end and adapted to engage the screw-threaded end of a complementary portion of a pipe, substantially as described.

In testimony whereof I have hereunto set my hand this 8th day of August, 1889.

NATHANIEL E. SMITH.

In presence of—
R. T. VAN BOSKERCK,
LOUIS W. FROST.